(12) United States Patent
Kim et al.

(10) Patent No.: US 11,093,753 B2
(45) Date of Patent: Aug. 17, 2021

(54) RGB-D CAMERA BASED TRACKING SYSTEM AND METHOD THEREOF

(71) Applicant: Robert Bosch GmbH, Stuttgart (DE)

(72) Inventors: Soohwan Kim, Sunnyvale, CA (US); Benzun Pious Wisely Babu, Worcester, MA (US); Zhixin Yan, Worcester, MA (US); Liu Ren, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 41 days.

(21) Appl. No.: 16/312,039

(22) PCT Filed: Jun. 26, 2017

(86) PCT No.: PCT/EP2017/065677
§ 371 (c)(1),
(2) Date: Dec. 20, 2018

(87) PCT Pub. No.: WO2017/220815
PCT Pub. Date: Dec. 28, 2017

(65) Prior Publication Data
US 2019/0377952 A1 Dec. 12, 2019

Related U.S. Application Data

(60) Provisional application No. 62/354,251, filed on Jun. 24, 2016.

(51) Int. Cl.
| G06K 9/00 | (2006.01) |
|---|---|
| G06T 7/579 | (2017.01) |
| G06F 16/783 | (2019.01) |
| G06T 7/20 | (2017.01) |

(52) U.S. Cl.
CPC ..... *G06K 9/00744* (2013.01); *G06F 16/7837* (2019.01); *G06T 7/20* (2013.01); *G06T 7/579* (2017.01); *G06T 2207/20072* (2013.01); *G06T 2207/20076* (2013.01); *G06T 2207/30241* (2013.01); *G06T 2207/30244* (2013.01)

(58) Field of Classification Search
None
See application file for complete search history.

(56) References Cited

U.S. PATENT DOCUMENTS

| 2012/0306847 A1 | 12/2012 | Lim et al. | |
|---|---|---|---|
| 2014/0333741 A1* | 11/2014 | Roumeliotis | G01C 21/165 |
| | | | 348/61 |

OTHER PUBLICATIONS

International Search Report corresponding to PCT Application No. PCT/EP2017/065677, dated Oct. 10, 2017 (English language document) (6 pages).

(Continued)

*Primary Examiner* — Leon Flores
(74) *Attorney, Agent, or Firm* — Maginot, Moore & Beck LLP (57) ABSTRACT

A visual SLAM system comprises a plurality of keyframes including a keyframe, a current keyframe, and a previous keyframe, a dual dense visual odometry configured to provide a pairwise transformation estimate between two of the plurality of keyframes, a frame generator configured to create keyframe graph, a loop constraint evaluator adds a constraint to the receiving keyframe graph, and a graph optimizer configured to produce a map with trajectory.

9 Claims, 5 Drawing Sheets

(56) References Cited

OTHER PUBLICATIONS

Kerl, Christian, et al., Dense Visual SLAM for RGB-D Cameras, 2013 IEEE/RSJ International Conference on Intelligent Robots and Systems (IROS), Nov. 3-7, 2013, Tokyo, Japan, pp. 2100-2106, XP_32537192A.
Kerl, Christian, et al., Robust Odometry Estimation for RGB-D Cameras, 2013 IEEE International Conference on Robotics and Automation (ICRA), May 6-10, 2013, Karlsruhe, Germany, pp. 3748-3754, XP_32506020A.
Strasdat, Hauke et al., Double Window Optimisation for Constant Time Visual SLAM, 2011 IEEE International Conference on Computer Vision, Nov. 6, 2011, pp. 2352-2359, XP_32101470A.
Babu, Benzun Wisely, et al., σ-DVO: Sensor Noise Model Meets Dense Visual Odometry, 2016 IEEE International Symposium on Mixed and Augmented Reality (ISMAR), Sep. 19, 2016, pp. 18-26, XP_33023403A.
Konolige, K. et al., Motilal, FrameSLAM: From Bundle Adjustment to Real-Time Visual Mapping, IEEE Transactions on Robotics, vol. 24, No. 5, Oct. 2008, pp. 1066-1077.
Audras, C. et al., Real-time dense appearance-based SLAM for RGB-D sensors, Proceedings of Australian Conference on Robotics and Automation, Dec. 2011, 10 pages.
Baker S. et al., Lucas-Kanade 20 Years On: A Unifying Framework, International Journal of Computer Vision, 56(3), pp. 221-255, 2004.
Gauglitz, S. et al., Live Tracking and Mapping from Both General and Rotation-Only Camera Motion, IEEE International Symposium on Mixed and Augmented Reality, 2012, pp. 13-22.
Kümmerle, R. et al., g2o: A General Framework for graph Optimization, 2011 IEEE International Conference on Robotics and Automation, Shanghai, China, May 2011, pp. 3607-3613.
Leonard, J. et al., Simultaneous Map Building and Localization for an Autonomous Mobile Robot, IEEE/RSJ International Workshop on Intelligent Robots and Systems IROS '91, vol. 3, Nov. 1991, Osaka, Japan, pp. 1442-1447.
Maimone, M. et al., Two Years of Visual Odometry on the Mars Exploration Rovers, Journal of Field Robotics, vol. 24, No. 3, pp. 169-186, 2007.
Mur-Artal, R. et al., ORB-SLAM: A Versatile and Accurate Monocular SLAM System, IEEE Transactions on Robotics, vol. 31(5), pp. 1147-1163, Oct. 2015.
Newcombe, R. et al., KinectFusion: Real-Time Dense Surface Mapping and Tracking, IEEE International Symposium on Mixed and Augmented Reality, Oct. 26-29, 2011, pp. 127-136.
Segal, A. et al., Generalized-ICP, Proceedings of Robotics: Science and Systems, Seattle, WA, USA, Jun. 28-Jul. 1, 2009, 8 pages.
Sturm, P. et al., A Factorization Based Algorithm for Multi-Image Projective Structure and Motion, 4th European Conference on Computer Vision, Cambridge, England, Apr. 1996, 10 pages.
Whelan, T. et al., ElasticFusion: Dense SLAM Without a Pose Graph, Robotics: Science and Systems, Rome, Italy, Jul. 2015, 9 pages.
Stückler, J. et al., Multi-Resolution Surfel Maps for Efficient Dense 3D Modeling and Tracking, Journal of Visual Communication and Image Representation, vol. 25(1), Jan. 2014, 30 pages.
Davison, A. J., Real-Time Simultaneous Localisation and Mapping with a Single Camera, Proceedings of the Ninth IEEE International Conference on Computer Vision (ICCV'03), vol. 2, Oct. 2003, 8 pages.
Endres, F. et al., An Evaluation of the RGB-D SLAM System, 2012 IEEE International Conference on Robotics and Automation, May 14-18, 2012, St. Paul, Minnesota, pp. 1691-1696.
Klein, G. et al., Parallel Tracking and Mapping for Small AR Workspaces, 6th IEEE and ACM International Symposium on Mixed and Augmented Reality, 2007; ISMAR 2007, Nov. 2007, 10 pages.
Marchand, E. et al., Pose Estimation for Augmented Reality: A Hands-On Survey, IEEE Transaction on Visualization and Computer Graphics, vol. 22, No. 12, Dec. 2016, pp. 2633-2651.
Gutiérrez-Gómez, D. et al., Inverse Depth for Accurate Photometric and Geometric Error Minimisation in RGB-D Dense Visual Odometry, 2015 IEEE International Conference on Robotics and Automation (ICRA), May 2015, pp. 83-89.
Sturm, J. et al., A Benchmark for the Evaluation of RGB-D SLAM Systems, 2012 IEEE/RSJ International Conference on Intelligent Robots and Systems, pp. 573-580, Oct. 2012.
Newcombe, R. et al., DTAM: Dense Tracking and Mapping in Real-Time, 2011 IEEE International Conference on Computer Vision, pp. 2320-2327, Nov. 2011.
Whelan, T. et al., Real-Time Large-Scale Dense RGB-D SLAM with Volumetric Fusion, The International Journal of Robotics Research 2015, vol. 34(4-5), pp. 598-626, Apr. 2015.
Ruhnke, M. et al., Highly Accurate 3D Surface Models by Sparse Surface Adjustment, 2012 IEEE International Conference on Robotics and Automation (ICRA), pp. 751-757, May 2012.
Press, W. H. et al., Numerical Recipes in C, The Art of Scientific Computing, Second Edition, Cambridge University Press, 1992, Section 10, pp. 408-412.

\* cited by examiner

RGB-D CAMERA BASED TRACKING SYSTEM AND METHOD THEREOF

CROSS-REFERENCE TO RELATED APPLICATION

This application is a 35 U.S.C. § 371 National Stage Application of PCT/EP2017/065677, filed on Jun. 26, 2017, which claims the benefit of U.S. Provisional Application No. 62/354,251, filed Jun. 24, 2016, the disclosures of which are herein incorporated by reference in their entirety.

FIELD

This disclosure relates generally to tracking systems and, more particularly, to a RGB-D camera based tracking system and method thereof.

BACKGROUND

Unless otherwise indicated herein, the materials described in this section are not prior art to the claims in this application and are not admitted to the prior art by inclusion in this section.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure related to a method for computing visual Simultaneous localization and Mapping (SLAM). The method comprises generating, by a visual odometry module, a local odometry estimate; generating, by a keyframe generator, keyframes; creating keyframe graph; adding constraint to the keyframe graph using a loop constraint evaluator; and optimizing the keyframe graph with trajectory. The method further comprising generating a new keyframe between a keyframe and a current frame before generating a local odometry estimate. The method of adding constraint to the keyframe graph using a loop constraint evaluator is based on a loop closure wherein the loop closure is the return to previously visited locations. The method further comprises adjusting a pose graph based on edge heights of different constraints in the keyframe graph after optimization.

According to another aspect of the disclosure, a method of applying a probabilistic sensor model for a dense visual odometry comprises generating, by a keyframe generator, keyframes, creating keyframe graph, adding constraint to the keyframe graph using a loop constraint evaluator, and optimizing the keyframe graph with trajectory. The method further comprises generating a new keyframe between a keyframe and a current frame before generating a local odometry estimate. The method of adding constraint to the keyframe graph using a loop constraint evaluator is based on a loop closure wherein the loop closure is the return to previously visited locations. The method further comprises adjusting a pose graph based on edge heights of different constraints in the keyframe graph after optimization.

According to another aspect of the disclosure, a method of t-distribution for photometric errors and a probabilistic sensor model for geometric errors comprises:

$$\hat{\xi}_{Hybrid} = \mathrm{argmin}_{\xi} \sum_{i=1}^{n} r_i^T W_i^{1/2} \Sigma^{-1} w_i^{1/2} r_i$$

According to another aspect of the disclosure, a visual SLAM system comprises a plurality of keyframes including a keyframe, a current keyframe, and a previous keyframe, a dual dense visual odometry configured to provide a pairwise transformation estimate between two of the plurality of keyframes, a frame generator configured to create keyframe graph, a loop constraint evaluator adds a constraint to the receiving keyframe graph, and a graph optimizer configured to produce a map with trajectory.

BRIEF DESCRIPTION OF THE DRAWINGS

These and other features, aspects, and advantages of this disclosure will become better understood when the following detailed description of certain exemplary embodiments is read with reference to the accompanying drawings in which like characters represent like arts throughout the drawings, wherein:

FIG. 3 illustrates a RGB-D camera sensor model; a

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Figure 1:
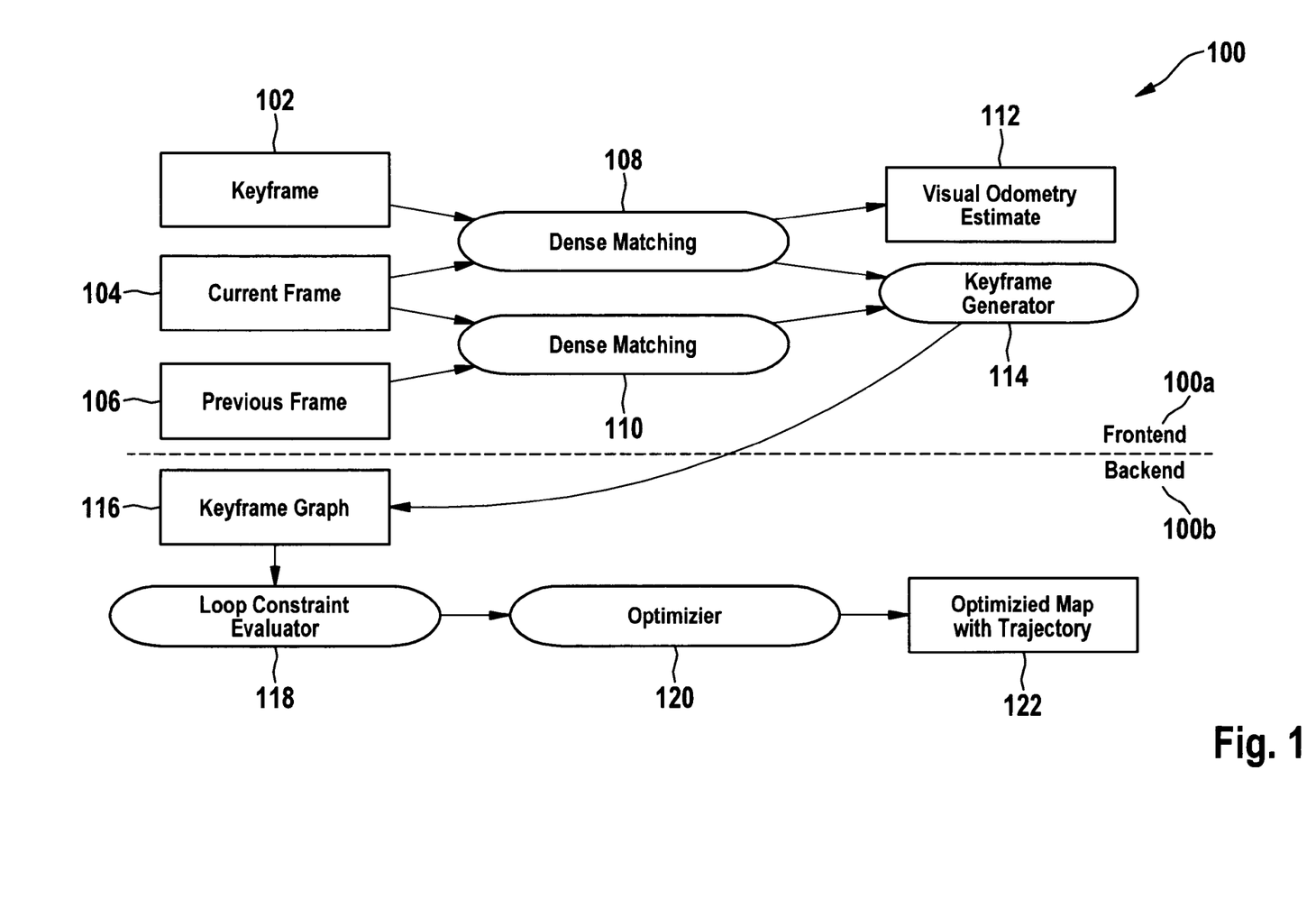
FIG. 1 is a block diagram illustrating a visual SLAM system.

FIG. 1 is a block diagram illustrating a visual Simultaneous Localization and Mapping (SLAM) system 100 divided into frontend 100a and backend 100b. At the frontend 100a, the system 100 uses visual odometry approach by making full use of all pixel information from an RGB-D camera to generate a local transformation estimate 112. Which is to say, dense visual odometry 108 or 110 provides a pairwise transformation estimate between two image frames 102, 104, 106. As illustrated, pairwise transformation estimate is performed between keyframe 102 and current frame 104 using dense visual odometry 108. Second pairwise transformation estimate is performed between current frame 104 and previous frame 106 using dense visual odometry 110. A keyframe generator 114 is used to generate a keyframe $V_k$ based on the quality of the odometry estimate. At the backend 100b of the system 100, a keyframe graph $G \subset \{V_k\}$ 116 using the keyframe generator 114 is created. At a loop constraint evaluator 118, constraints based on the return, e.g. loop closure to previously visited locations are added to the keyframe graph to improve its connectivity. Graph optimizer 120 then optimizes the final graph with constraints to produce an optimized map with trajectory 122. More details on the keyframe graph 116 and the loop constraint evaluator 118 will be described below. A probabilistic sensor model is used in the front-end 100a and performs keyframe generation 114, and loop constraint detection 118 and graph optimization 120 in the back-end 100b.

Figure 2:
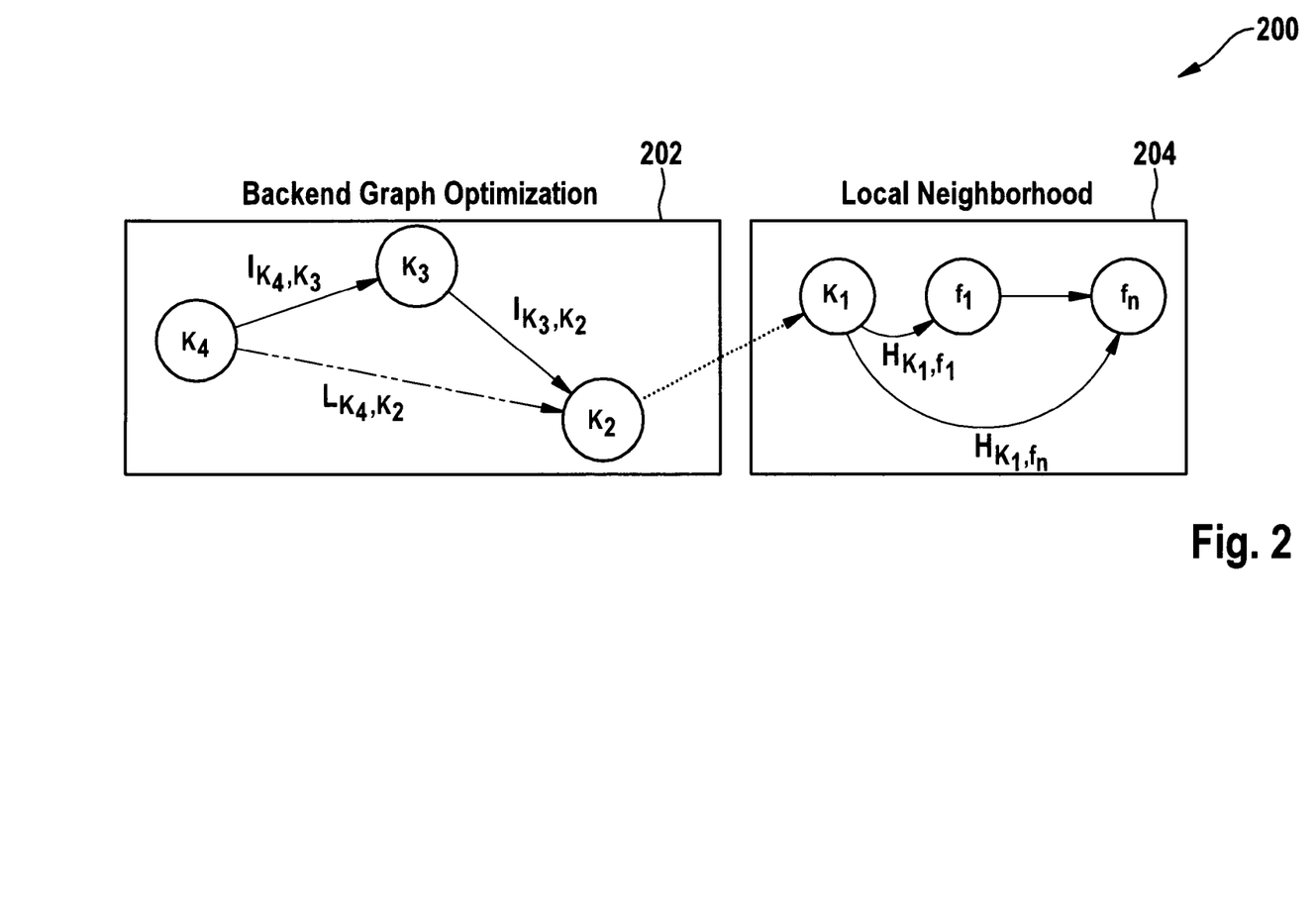
FIG. 2 is a block diagram illustrating the structure of an example keyframe graph and loop constraint evaluator.

FIG. 2 is a block diagram illustrating a structure of an example keyframe graph 200 comprises a backend graph optimization 202 and a local neighborhood 204. In the back-end graph optimization 202, the loop constraints $L_{Ki,Kj}$ combined with odometry constraints weighted by $I_{K\_i,K\_j}$ is optimized. Recent keyframe $K_1$ and the frames tracked with respect to $K_1$, $(f_1, \ldots, f_n)$ are included in the local neighborhood 204. The keyframes $K_1$ and the tracked frames $(f_1, \ldots, f_n)$ are determined based on the ratio of entropies $H_{K1,f1}/H_{K1,fn}$. When the current frame does not contain sufficient information to track a new frame, a new keyframe is generated by using entropy of a camera pose estimate. The camera pose estimate generates a new keyframe when the estimated entry between the keyframe and the current frame falls below a threshold normalized by the largest estimate entropy in the local neighborhood 204. The largest estimate entropy is assumed to be the one between the keyframe and the first frame. An additional key frame generation strategy based on the curve estimate of the camera trajectory is proposed. The curve estimate $\rho_{i,k}$ between Frames i and k is defined as the ratio of the sum of the translations between the frames $(\delta_{i,i-1})$ in the local neighborhood N with respect to the translation between the keyframe and the latest frame $(\delta_{i,k})$.

$$\rho = \frac{\sum_{i \in N}^{k} \delta_{i,i-1}}{\delta_{i,k}} \qquad \text{equation (1)}$$

The return to a previously visited location helps identify additional constraints to the graph called loop closure at the loop constraint evaluator 118 as illustrated in FIG. 2. After optimization, the pose graph is adjusted based on the edge weights of different constraints in the graph. An erroneous loop constraint sometime can lead to a poorly optimized final trajectory. Extending previous loop constraint generation methods, two additional techniques can be used to reduce the impact of wrong loop constraints. Firstly, the loop closure constraints are weighted based on the inverse square of the metric distance between the keyframes that form the loop closure. This is based on the intuition that loop constraint between far frames is prone to a larger error than frames close to one another. Secondly, occlusion filtering is performed to remove false loop closure constraints. The depth image provides geometry information which can be used to perform occlusion filtering between two keyframes. The standard deviation of sensor model uncertainty of a depth point provides a bound on the maximum possible depth shift of the following equation:

$$\eta(Z_i) = \frac{q_{pix}bf}{2}\left[\frac{1}{Rnd\left(\frac{q_{pix}bf}{Z_i} - 0.5\right)} - \frac{1}{Rnd\left(\frac{q_{pix}bf}{Z_i} + 0.5\right)}\right] \qquad \text{equation (2)}$$

All points which violates this assumption are considered as occlusion.

On generation of a new keyframe, the back-end graph is updated with the previous keyframe information and a double window graph structure 200 is created. The pose graph in the back-end is optimized using for example an open source library, g2o. A final optimization on the termination of the visual odometry is performed to generate optimized camera trajectory estimate.

Generally, RGB-D cameras project infra-red patterns and recover depth from correspondences between two image views with a small parallax. During this process, the disparity is quantized into sub-pixels. This introduces a quantization error in the depth measurement. The noise due to quantization error in depth measurement is defined as $$\eta(Z_i) = \frac{q_{pix}bf}{2}\left[\frac{1}{Rnd\left(\frac{q_{pix}bf}{Z_i} - 0.5\right)} - \frac{1}{Rnd\left(\frac{q_{pix}bf}{Z_i} + 0.5\right)}\right] \qquad \text{equation (3)}$$

where $q_{pix}$ is the sub-pixel resolution of the device, b is the baseline, and f is the focal length. This error increases quadratically with range $Z_i$, thus preventing the use of depth observations from far objects. The 3D sensor noise of RGB-D cameras can be modeled with a zero-mean multivariate Gaussian distribution whose covariance matrix has the following as the diagonal components:

$$\sigma_{11}^2 = \tan\left(\frac{\beta_x}{2}\right)Z_i, \sigma_{22}^2 = \tan\left(\frac{\beta_y}{2}\right)Z_i, \sigma_{33}^2 = \eta(Z_i)^2 \qquad \text{equation (4)}$$

where the $\sigma_{33}^2$ direction is along the ray, and $\beta_x$ and $\beta_y$ denote the angular resolutions in x and y directions.

Figure 3:
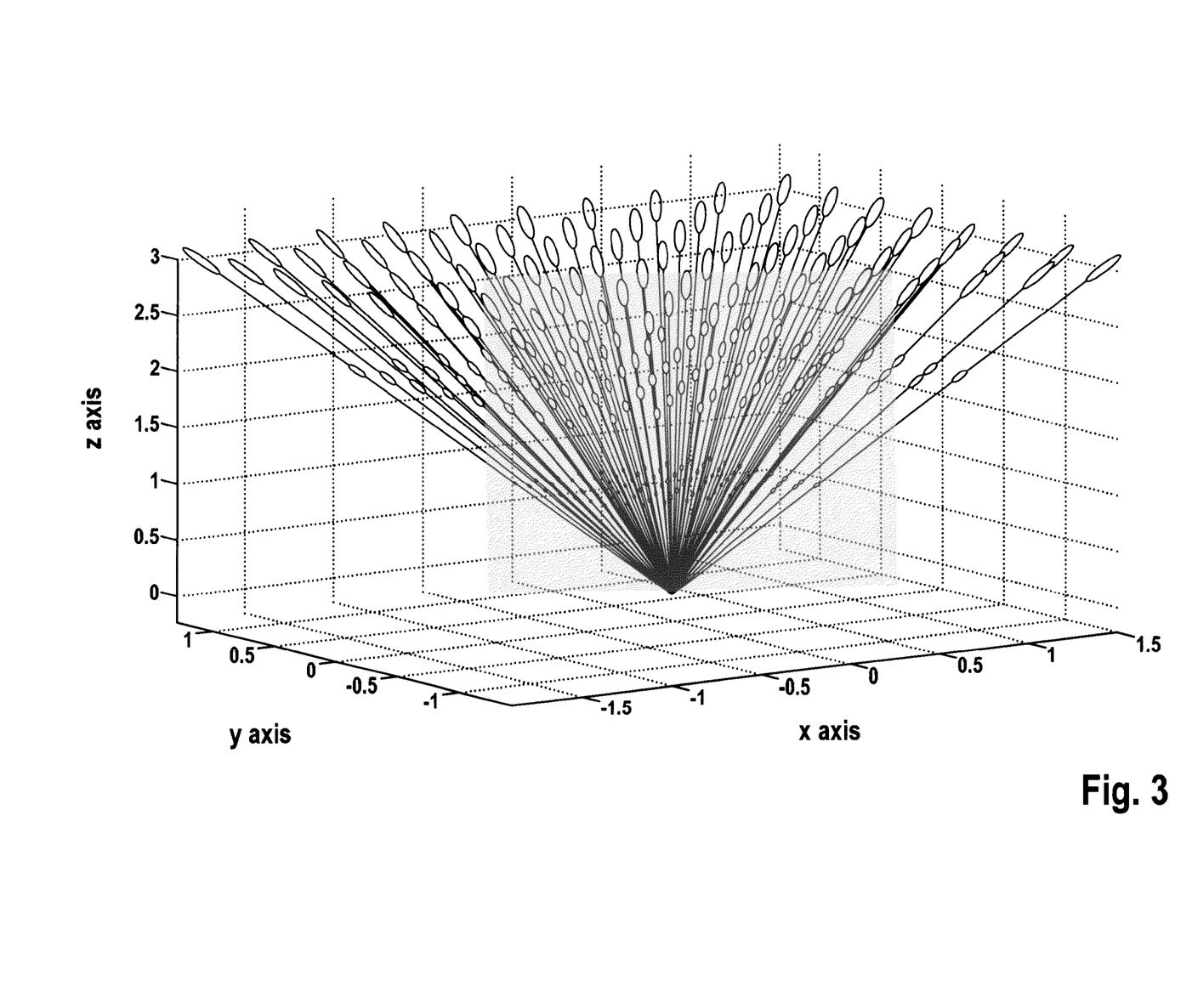

FIG. 3 illustrates a RGB-D camera sensor model. The camera is located at the origin and is looking up in the z direction. For each range of 1, 2, and 3 meters, 80 points are sampled and their uncertainties are expressed with ellipsoids. The error in the ray direction increases quadratically.

Figure 4:
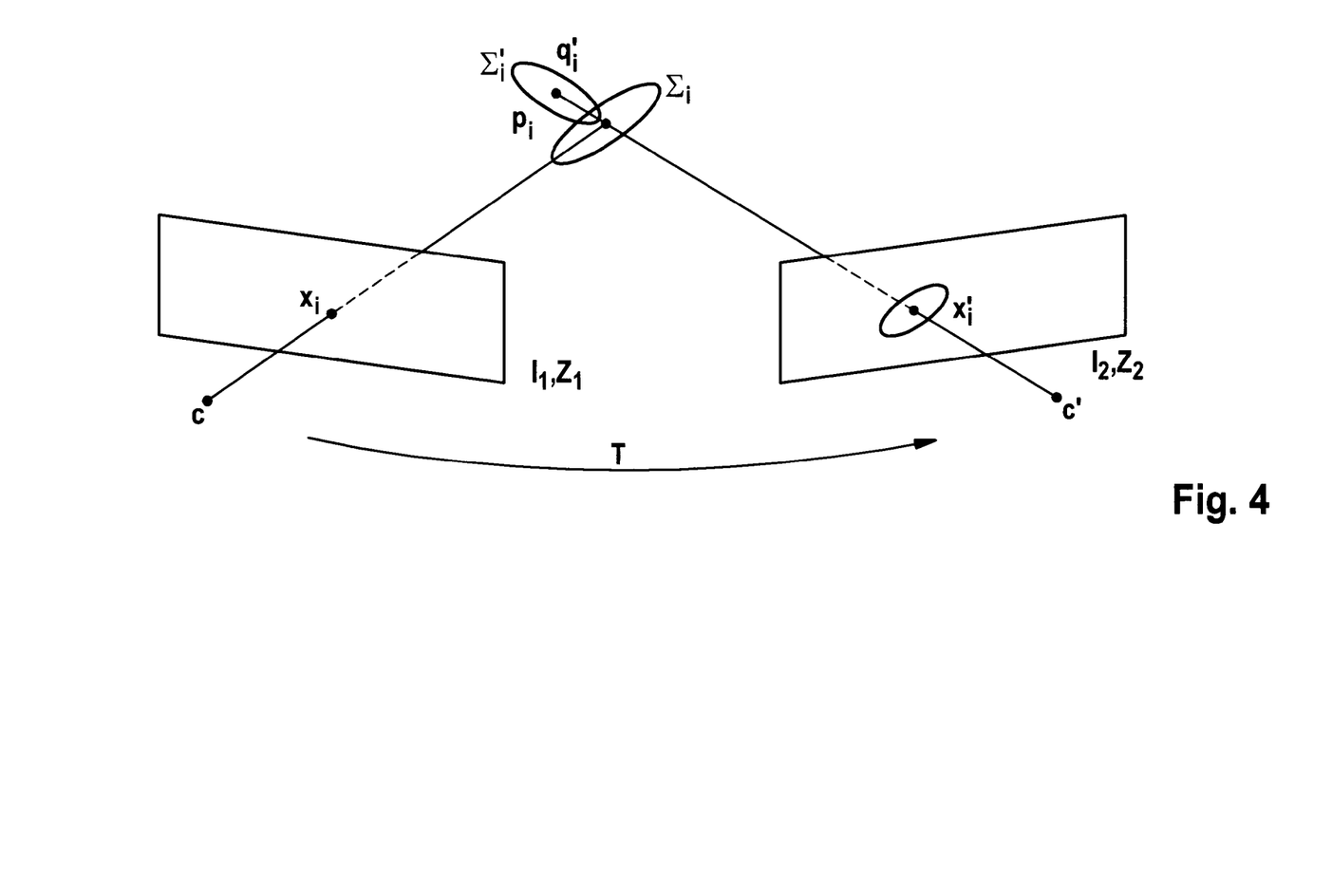
FIG. 4 is a block diagram of an uncertainty propagation.

FIG. 4 is a block diagram of an uncertainty propagation. Each 3D point $p_i$ in FIG. 4 is associated with a Gaussian distribution whose covariance matrices are $\Sigma_1$ and $\Sigma_1'$, respectively, $$p(p_i) = \mathcal{N}(\overline{p}_i, \Sigma_i) \qquad \text{equation (5)}$$

where $$\sum_i = R_{ray}\begin{bmatrix} \sigma_{11}^2 & 0 & 0 \\ 0 & \sigma_{22}^2 & 0 \\ 0 & 0 & \sigma_{33}^2 \end{bmatrix}R_{ray}^T \qquad \text{equation (6)}$$

$R_{ray}$ denotes the rotation matrix between the ray and camera coordinates.

A method of linearization is used to propagate the uncertainty to the residuals and the likelihood function can be expressed as a Gaussian distribution, $$p(r|\xi) = \mathcal{N}(\mu_i, \Sigma_i) \quad \text{equation (7)}$$

where $$\mu_i = \begin{bmatrix} \mu_i^I \\ \mu_i^Z \end{bmatrix} = \begin{bmatrix} I_2(\pi(g(\bar{p}_i, \xi))) - I_1(x_i) \\ Z_2(\pi(g(\bar{p}_i, \xi))) - [g(\bar{p}_i, \xi)]_Z \end{bmatrix} \quad \text{equation (8)}$$

$$\Sigma_i = J_i \Sigma_i' J_i^T + \mathrm{diag}\left(0, [\Sigma_i']_{3,3}\right) \quad \text{equation (9)}$$

$$J_i^T = [\nabla r_i^I \; \nabla r_i^Z] = \begin{bmatrix} \frac{\partial r_i^I}{\partial p_i} & \frac{\partial r_i^Z}{\partial p_i} \end{bmatrix} \quad \text{equation (10)}$$

Here, $[\Sigma_i']_{3,3}$ denotes the variance of the back-projected point $q_i'$ in the z axis of the current camera coordinates as shown in FIG. 4. The maximum likelihood estimation is, $$\hat{\xi}_{Sensor} = \mathrm{argmin}_{\xi} \sum_{i=1}^{n} r_i^T \Sigma_i^{-1} r_i \quad \text{equation (11)}$$

The individual precision matrix is split as two square roots $\Sigma_i^{-1} = \Sigma_i^{-1/2} \Sigma_i^{-1/2}$ and normalize it by applying the single precision matrix of the weighted residuals $\Sigma^{-1}$ as $$\hat{\xi}_{Sensor} = \mathrm{argmin}_{\xi} \sum_{i=1}^{n} r_i^T \Sigma_i^{-1/2} \Sigma^{-1} \Sigma_i^{-1/2} r_i \quad \text{equation (12)}$$

The photometric and geometric errors can be defined as, $$r_i = \begin{bmatrix} r_i^I \\ r_i^Z \end{bmatrix} = \begin{bmatrix} I_2(\pi(g(\pi^{-1}(x_i, Z_i), \xi))) - I_1(x_i), \\ Z_2(\pi(g(\pi^{-1}(x_i, Z_i), \xi))) - [g(\pi^{-1}(x_i, Z_i), \xi)]_Z \end{bmatrix} \quad \text{equation (13)}$$

where $Z_i = Z_1(x_i)$ and $[\cdot]_Z$ denotes the z component of the vector.

To find the relative camera pose which minimizes the photometric and geometric errors, the energy function is the sum of weighted square errors as $$\hat{\xi} = \mathrm{argmin}_{\xi} \sum_{i=1}^{n} r_i^T W r_i \quad \text{equation (14)}$$

where n is the total number of valid pixels, and $W \in \mathbb{R}^{2 \times 2}$ denotes the weights for different errors.

Since the energy function is non-linear with respect to the relative camera pose $\xi$, the Gauss-Newton algorithm is usually applied to numerically find the optimal solution and the equation (14) is now updated to:

$$\xi_{k+1} = \xi_k + \Delta\xi, (J^T(I_n \otimes W)J)\Delta\xi = -J^T(I_n \otimes W)r \quad \text{equation (15)}$$

where $\otimes$ denotes the Kronecker product, $r = (r_1, \ldots, r_n)^T \in \mathbb{R}^{2n \times 1}$, and the Jacobian matrix is defined as $$J = \begin{bmatrix} J_1 \\ \vdots \\ J_n \end{bmatrix} \in \mathbb{R}^{2n \times 6}, \; J_i = \begin{bmatrix} \frac{\partial r_i^I}{\partial \xi_1} & \cdots & \frac{\partial r_i^I}{\partial \xi_6} \\ \frac{\partial r_i^Z}{\partial \xi_1} & \cdots & \frac{\partial r_i^Z}{\partial \xi_6} \end{bmatrix} \in \mathbb{R}^{2 \times 6} \quad \text{equation (16)}$$

Eq. (14) is equivalent with maximum likelihood estimation where each residual is independent and follows an identical Gaussian distribution, $$\hat{\xi}_{ML} = \mathrm{argmax}_{\xi} \sum_{i=1}^{n} \log p(r_i | \xi) \quad \text{equation (17)}$$

where $p(r_i | \xi) = N(0, \Sigma)$. Note that this corresponds to the case of $W = \Sigma^{-1}$ in Eq. (14). The Eq. (17) can be rewritten as:

$$\hat{\xi}_{DVO} = \mathrm{argmin}_{\xi} \sum_{i=1}^{n} w_i r_i^T \Sigma^{-1} r_i \quad \text{equation (18)}$$

where $w_i = (v+2)/(v + r_i^T \Sigma^{-1} r_i)$. Note that this corresponds to the case of $W = w_i \Sigma^{-1}$ in Eq. (14).

A T-distribution for photometric errors and propagate a sensor model of a Gaussian distribution for geometric errors by combining Eq (11) AND Eq (18) to now defined as σ-dense visual odometry (σ-DVO):

$$\hat{\xi}_{Hybrid} = \mathrm{argmin}_{\xi} \sum_{i=1}^{n} r_i^T W_i^{1/2} \Sigma^{-1} W_i^{1/2} r_i \quad \text{equation (19)}$$

where the weight matrix $w_i = \mathrm{diag}(w_i^I, w_i^Z)$ and $$w_i^I = \frac{v+1}{v + \left(\frac{r_i^I}{\sigma}\right)^2} \quad \text{equation (20)}$$

$$w_i^Z = \frac{1}{\nabla r_i^Z \Sigma_i^{-1} \nabla r_i^{Z\top} + [\Sigma_i']_{3,3}} \quad \text{equation (21)}$$

The σ-DVO algorithm can be implemented in any suitable client devices such as smart phone, tablet, mobile phone, personal digital assistant (PDA), and any devices. Back to FIG. 1, the SLAM system 100 with integrated σ-DVO algorithm uses smaller number of keyframes and is due to a reduced drift in the system. A reduced number of keyframes indicates less computational requirements in the back-end of the system.

Figure 5:
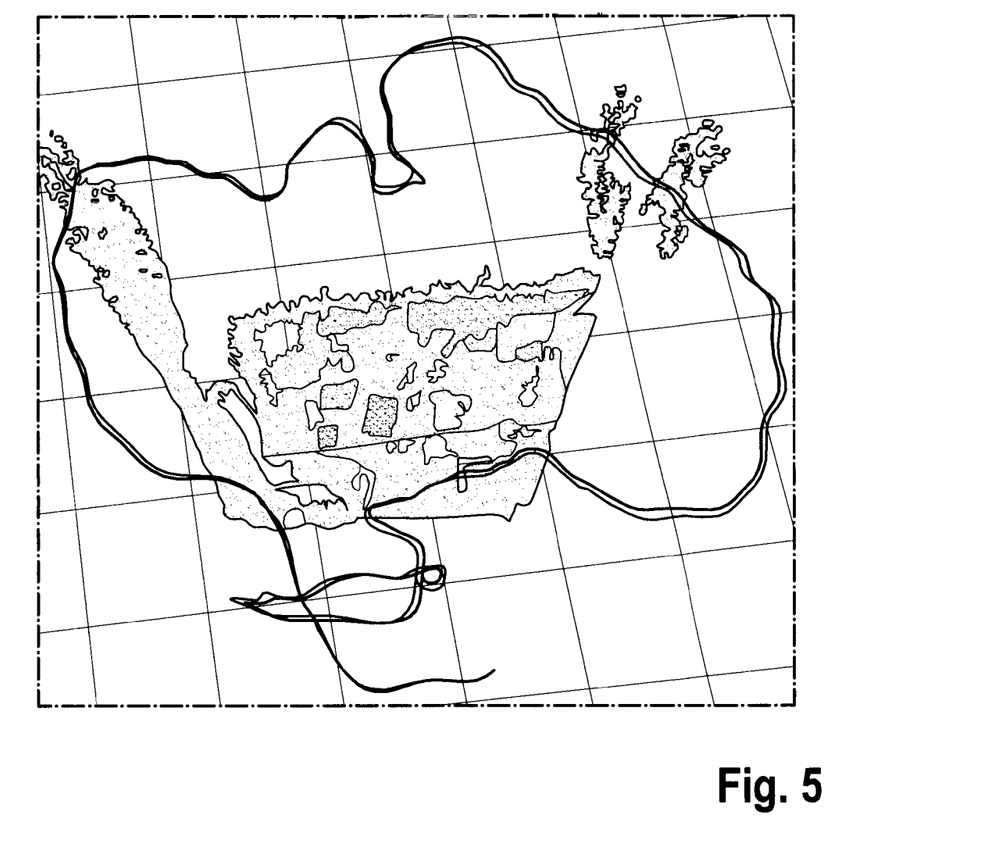
FIG. 5 illustrates an example of a map generated by a σ-DVO SLAM system

FIG. 5 illustrates an example of a map generated by a σ-DVO SLAM system 100. As can be seen, a consistent trajectory is generated using the σ-DVO SLAM system 100.

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the sprit and scope of this disclosure.

Embodiments within the scope of the disclosure may also include non-transitory computer-readable storage media or machine-readable medium for carrying or having computer-executable instructions or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Embodiments may also be practiced in distributed computing environments where tasks are performed by local and remote processing devices that are linked (either by hard-wired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the patent has been described with reference to various embodiments, it will be understood that these embodiments are illustrative and that the scope of the disclosure is not limited to them. Many variations, modifications, additions, and improvements are possible. More generally, embodiments in accordance with the patent have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for visual Simultaneous localization and Mapping (SLAM), the method comprising:
   capturing, with a camera, image frames of an environment, each image frame having an array of pixels, each pixel having an intensity and a depth;
   selecting, with a processor, keyframes from the image frames;
   determining, with the processor, an odometry estimate based on the image frames, the odometry estimate including estimated camera poses from which each of the image frames were captured, the estimated camera poses being determined in part based on a sensor noise model that indicates an uncertainty of the depth of each pixel of each of the image frames;
   generating, with the processor, a keyframe graph including the keyframes, relative transformations between the estimated camera poses of the keyframes defining first constraints for the keyframe graph;
   adding, with the processor, at least one second constraint to the keyframe graph in response to detecting at least one loop closure using a loop constraint evaluator; and
   optimizing the keyframe graph and the odometry estimate based on the estimated camera poses of the keyframes and the first constraints and the at least one second constraint of the keyframe graph.

2. The method of claim 1, the determining the odometry estimate further comprising:
   determining the estimated camera poses in part based on t-distribution that indicates an uncertainty of the intensity of each pixel of each of the image frames.

3. The method of claim 1 wherein the sensor noise model indicates relatively more uncertainty for depths relatively further from the camera and relatively less uncertainty for depths relatively closer from the camera.

4. The method of claim 1, the optimizing the keyframe graph further comprising:
   weighting the first constraints and the at least one second constraint of the keyframe graph based on a propagated uncertainty of the depth of each pixel of each of the image frames.

5. A method for dense visual odometry, the method comprising:
   capturing, with a camera, image frames, each image frame having an array of pixels, each pixel having an intensity and a depth;
   selecting, with a processor, keyframes from the image frames;
   determining, with the processor, an odometry estimate based on the image frames, the odometry estimate including estimated camera poses from which each of the image frames were captured, the estimated camera poses being determined in part based on a sensor noise model that indicates an uncertainty of the depth of each pixel of each of the image frames;
   generating, with the processor, a keyframe graph including the keyframes, relative transformations between the estimated camera poses of the keyframes defining constraints for the keyframe graph;
   optimizing the keyframe graph and the odometry estimate based on the estimated camera poses of the keyframes and the constraints of the keyframe graph.

6. The method of claim 5, the determining the odometry estimate further comprising:
   determining the estimated camera poses in part based on t-distribution that indicates an uncertainty of the intensity of each pixel of each of the image frames.

7. The method of claim 5 wherein the sensor noise model indicates relatively more uncertainty for depths relatively further from the camera and relatively less uncertainty for depths relatively closer from the camera.

8. The method of claim 5, the optimizing the keyframe graph further comprising:
   weighting the first constraints and the at least one second constraint of the keyframe graph based on a propagated uncertainty of the depth of each pixel of each of the image frames.

9. A visual Simultaneous localization and Mapping (SLAM) system, the system comprising:
   a camera configured to capture image frames of a 3D environment, each image frame having an array of pixels, each pixel having an intensity and a depth; and a processor configured to:
  select keyframes from the image frames;
  determine an odometry estimate based on the image frames, the odometry estimate including estimated camera poses from which each of the image frames were captured, the estimated camera poses being determined in part based on a sensor noise model that indicates an uncertainty of the depth of each pixel of each of the image frames;
  generate a keyframe graph including the keyframes, relative transformations between the estimated camera poses of the keyframes defining constraints for the keyframe graph; and
  optimize the keyframe graph and the odometry estimate based on the estimated camera poses of the keyframes and the constraints of the keyframe graph.

* * * * *